(12) United States Patent
Heung et al.

(10) Patent No.: US 8,470,073 B2
(45) Date of Patent: Jun. 25, 2013

(54) APPARATUS AND PROCESS FOR SEPARATING HYDROGEN ISOTOPES

(75) Inventors: Leung K. Heung, Aiken, SC (US); Henry T. Sessions, Aiken, SC (US); Xin Xiao, Augusta, GA (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 286 days.

(21) Appl. No.: 12/882,962

(22) Filed: Sep. 15, 2010

(65) Prior Publication Data
US 2012/0060688 A1 Mar. 15, 2012

(51) Int. Cl.
*B01D 59/26* (2006.01)
*B01D 53/02* (2006.01)

(52) U.S. Cl.
USPC ............................ 95/116; 423/248; 423/647.7

(58) Field of Classification Search
USPC ................. 95/115, 116; 423/210, 248, 647.7, 423/658.3; 976/DIG. 377
See application file for complete search history.

(56) References Cited

U.S. PATENT DOCUMENTS

| | | | | |
|---|---|---|---|---|
| 3,989,484 A * | 11/1976 | Hamrin et al. | ...... | 95/98 |
| 4,036,720 A * | 7/1977 | Clark et al. | ...... | 204/177 |
| 4,528,003 A * | 7/1985 | Dittrich et al. | ...... | 96/4 |
| 4,687,644 A * | 8/1987 | Iniotakis et al. | ...... | 422/159 |
| 4,867,762 A * | 9/1989 | Pierini et al. | ...... | 95/116 |
| 5,041,147 A * | 8/1991 | Knize et al. | ...... | 96/131 |
| 5,248,649 A * | 9/1993 | Mosley, Jr. | ...... | 502/262 |
| 5,298,196 A * | 3/1994 | Heung | ...... | 588/16 |
| 5,312,597 A * | 5/1994 | Heung | ...... | 422/159 |
| 5,505,829 A * | 4/1996 | Villa-Aleman | ...... | 204/157.2 |
| 6,328,801 B1 * | 12/2001 | Gary et al. | ...... | 118/688 |

FOREIGN PATENT DOCUMENTS

| | | |
|---|---|---|
| EP | 0 084 867 | 8/1983 |
| JP | 11 137969 | 5/1999 |

OTHER PUBLICATIONS

Machine-generated English translation of JP 11-137969, published May 1999.*
M.W. Lee; Paper proposed for presentation at Gordon Research Conferences, Feb. 19-14, 1986 entitled "*Tritium Separation using Metal Hydrides*"; 35 pages.
A.S. Horen and M. W. Lee Fusion Technology, vol. 21, Mar. 1992, pp. 282-286; entitled "*Metal Hydride Based isotope Separation—Large-Scale Operations*".
L.K. Heung, H.T. Sessions, A.S. Poore, W.D. Jacobs and C.S. Williams; Fusion Science and Technology, vol. 54, Aug. 2008 pp. 399-402 entitled "*Next-Generation TCAP Hydrogen Isotope Separation Process*".
International Search Report, PCT/US2011/001606, Savannah River Nuclear Solutions, LLC, Feb. 2, 2012, ISA/EP.

* cited by examiner

*Primary Examiner* — Frank Lawrence, Jr.
(74) *Attorney, Agent, or Firm* — Bennett Mullinax, LLC (57) ABSTRACT

The apparatus and process for separating hydrogen isotopes is provided using dual columns, each column having an opposite hydrogen isotopic effect such that when a hydrogen isotope mixture feedstock is cycled between the two respective columns, two different hydrogen isotopes are separated from the feedstock.

12 Claims, 11 Drawing Sheets

APPARATUS AND PROCESS FOR SEPARATING HYDROGEN ISOTOPES

STATEMENT AS TO RIGHTS TO INVENTIONS MADE UNDER FEDERALLY SPONSORED RESEARCH AND DEVELOPMENT

This invention was made with Government support under Contract No. DE-AC09-08SR22470 awarded by the United States Department of Energy. The Government has certain rights in the invention.

FIELD OF THE INVENTION

This invention is directed towards an apparatus and process for separating hydrogen isotopes. More particularly, the invention is directed toward a process for the production or recovery of tritium or deuterium, including radioactive tritium, from hydrogen streams, including waste streams.

BACKGROUND OF THE INVENTION

Thermal Cycling Absorption Process (TCAP) is a well known hydrogen isotope separation technology. TCAP uses the isotopic effect of palladium absorption of hydrogen isotopes and different equilibrium pressures for isotope separation in the preference of tritium>deuterium>protium.

The conventional TCAP process uses a palladium deposited on kieselguhr (Pd/k) packed column with a plug flow revereser (PFR). The PFR is a larger diameter but shorter column packed with kieselguhr to enhance its plug flow characteristics. In operation, the Pd/k column temperature is cycled and the PFR is maintained at ambient temperature. During the cold phase of the cycle, gas flow is from the PFR to the Pd/k column and the heavier isotope is concentrated in the flow front. During the hot phase of the cycle, gas flows from the Pd/k column to the PFR and the concentration profile is mostly preserved due to the smaller isotopic effect of high temperature and the plug flow characteristic of the PFR.

The PFR in the above described process only provides a volume for the Pd/k column to regenerate. The passive PFR process does not provide for any separation of isotopes. While the TCAP using a passive PFR will produce a high purity heavy isotope product, it is not well suited to produce high purity light isotope within the raffinate stream at the same time.

Accordingly, there is room for variation and improvement within the art.

SUMMARY OF THE INVENTION

It is an aspect of at least one embodiment of the present invention to provide for an improved apparatus and process for the production and/or recovery of tritium and deuterium from hydrogen streams.

It is a further aspect of at least one embodiment of the present invention to provide for an apparatus and process for the removal of radioactive tritium from a hydrogen waste stream.

It is a further aspect of one embodiment of the present invention to provide for a thermal cycling absorption process using two packed columns where each column can be cooled and heated to cycle appropriate temperatures. Each column may independently use to absorb/adsorb hydrogen isotopes which can be separated via cooling and heated separation steps. The dual columns have opposite absorption properties toward the isotopes which allows for a mixture of isotopes to be separated into two pure products.

These and other features, aspects, and advantages of the present invention will become better understood with reference to the following description and appended claims.

BRIEF DESCRIPTION OF THE DRAWINGS

A fully enabling disclosure of the present invention, including the best mode thereof to one of ordinary skill in the art, is set forth more particularly in the remainder of the specification, including reference to the accompanying drawings.

DESCRIPTION OF THE PREFERRED EMBODIMENT

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers are used throughout to describe the same material, apparatus, or process pathway. To avoid redundancy, detailed descriptions of much of the apparatus once described in relation to a figure is not repeated in the descriptions of subsequent figures, although such apparatus or process is labeled with the same reference numbers.

Hydrogen has three isotopes protium ($H_2$), deuterium ($D_2$) and tritium ($T_2$). The terms light and heavy (or lighter and heavier) will be used to described the relative weight of these isotopes. Their order in weight from light to heavy is protium, deuterium then tritium. Protium and deuterium, the non radioactive isotopes of hydrogen, are used in the embodiments of the invention. But any pair of three isotopes may be used in the descriptions. When there are three isotopes in the feed, the feed is separated into two streams at a time.

The Pd/k Column

The Pd/k (palladium deposited on kieselguhr) column was fabricated with ⅜" OD, 0.035" wall copper tubing, bent in the shape of a paper clip. Each tube for the "paper clip" is about 10 feet long. Two clips are used to make a total length of 20 feet 10 inches. The volume of this 20-foot column is 312 cc, which is filled with 312 grams of Pd/k. Cajon filter gaskets with 10 micron grade frits were installed at all 4 ends (see FIG. 1) of the column to prevent Pd/k from escaping. Copper tubing, bent to conform to the column shape is used for flowing liquid nitrogen to cool the column.

Two electric heaters, Aerorod® BXX13B62-4T, are used to heat the column. The cooling tubes and the heaters are assembled in close contact with the column and are held in place with metal clamps. Four thermocouples, two on each side, are mounted on the outside surface of the column with J-B Weld cold weld, about 1 foot from the top of the "paper clip". The assembly is wrapped with a layer of copper wool for heat transfer and then Kaowook for thermal insulation. A schematic of the Pd/k column is seen in FIG. 1.

Palladium is the active material which reacts with the hydrogen isotopes and causes them to separate. Kieselguhr is a porous diatomite particulate and which provides support for the palladium. Kieselguhr does not directly adsorb or separate hydrogen isotopes but functions as support for the palladium to increase reaction kinetics and reduce pressure drop as the gas flows through the column. Kieselguhr, in the plug flow reverser (PFR), is also used to increase the plug flow characterics.

Figure 1:
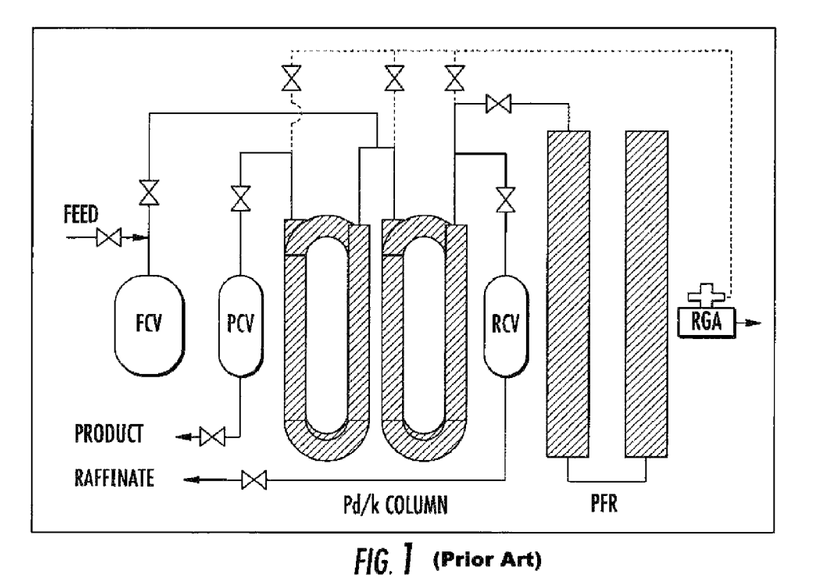
FIG. 1 is a process flow diagram of a conventional Pd/k column-PFR configuration to use for the low temperature palladium absorption of hydrogen isotopes and the high temperature palladium release of hydrogen.

The PFR uses two 3-ft 2-in OD stainless steel tubes having a volume of about 3 liters connected in the shape of a U as seen in FIG. 1. It is filled with kieselguhr to increase the plug flow characteristic. The void volume is about 2.5 liters.

The Pd/k Column-PFR Configuration

The Pd/k column-PFR structure reference in FIG. 1 and described above is the prior art configuration for the TCAP process. In this configuration, the temperature of the Pd/k column is cycled between about −40 and 150° C. At the low temperature, palladium absorbs hydrogen isotopes that cause the gas to flow from the PFR to the column. At higher temperature, palladium releases the hydrogen that makes the gas to flow to the PFR. The PFR stays at room temperature and provides a volume for the gas to flow in and out of the Pd/k column and does not offer any separation functions. The Pd/k column provides the sole isotope separation function.

Figure 3:
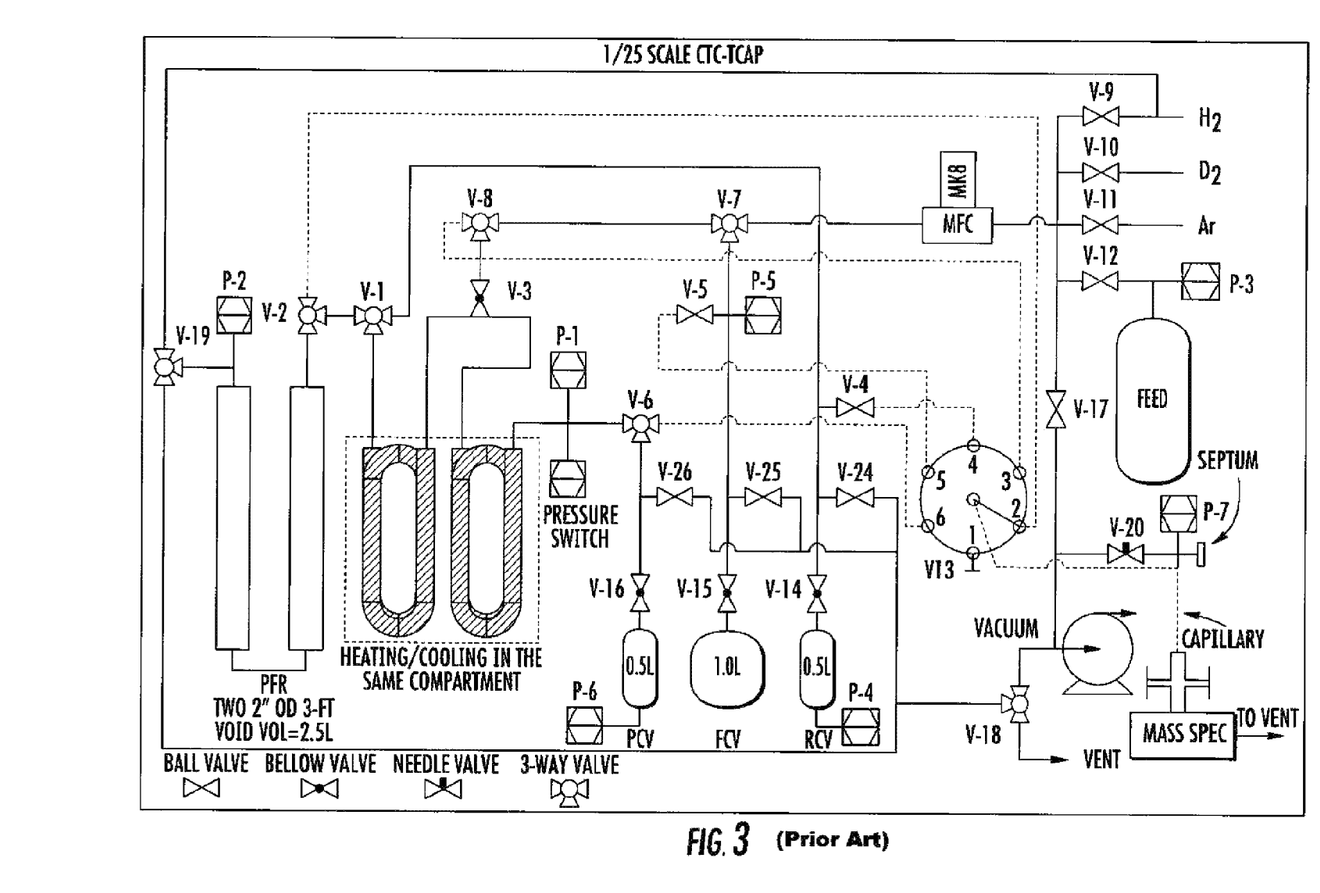
FIG. 3 is a process flow diagram setting forth additional details of the schematic as seen in reference to FIG. 1.

FIG. 3 shows a process flow diagram of the TCAP Pd/k column-PFR configuration. In addition to the Pd/k column and the PFR, three calibrated volumes, namely FCV, PCV and RCV are used to measure the feed to the column, and the removal of product and raffinate from the column, respectively. A feed tank holds the $H_2$ and $D_2$ mixture for the feed. While not illustrated in FIG. 3, are two tanks are used to hold the product and raffinate produced by the process. A mass spectrometer is used as a residue gas analyzer and an online sampling system analyze the gas streams for process performance measurement and control. A vacuum pump supports the evacuation needs of the operation and the sampling system. A computer with LabVIEW software for data acquisition and instrument control is also utilized. Liquid nitrogen is used to provide the low temperatures required for the cooling cycles. The process may be operated manually for turning the valves for gas transfers, sampling and cooling, switching on and off the heaters, and entering to the computer values of pressure, temperature and mass spec numbers for calculating control parameters. However, a fully automated process is envisioned.

The MS Inverse Column

Figure 2:
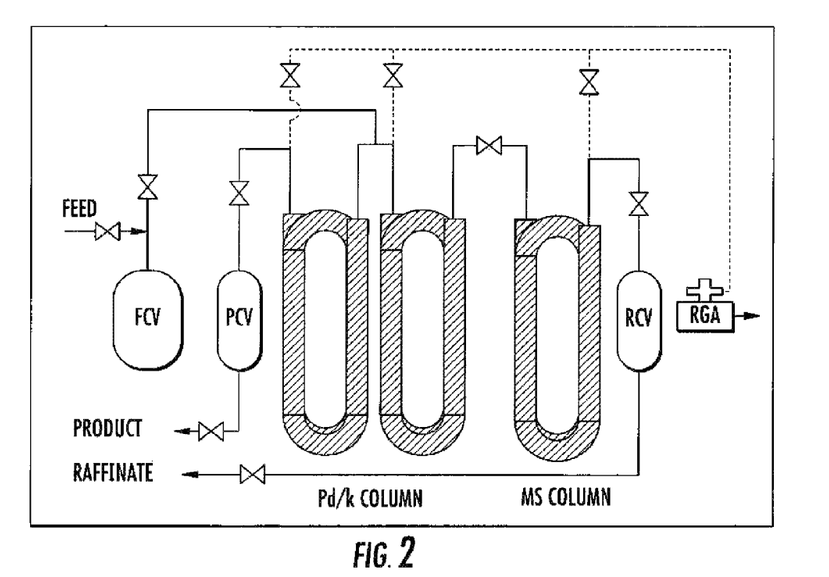
FIG. 2 is a schematic of a process flow diagram of the present invention, using an active inverse column with a Pd/k column.

The inverse column seen in reference to FIG. 2 is fabricated from ⅜" OD 0.035" wall stainless steel tubing and packed with molecular sieve type 4A. The column length is approximately 11 feet. The molecular sieve has an isotopic effect opposite to that of the palladium. The molecular sieve (MS) was purchased from Sigma Aldrich in the form of ⅛" pellets. The pellet was crushed to 30-50 mesh particles before it was loaded into the column. The volume of the loaded MS was 157 cc, having a non-dried weight of 117 g and a dried weight of about 99 gram. Similar to the Pd/k column, the MS column is bent into the shape of a paper clip. It is traced with ¼" copper tubing for liquid nitrogen cooling. Two electric heaters (Aerorod® BXX13B33-4T) inserted in ¼" copper tubing is used for heating. Four thermocouples were attached to the outside surface near the middle of the column for measuring the temperature. The column, the cooling tube and heater well are held in close contact with metal clamps, and wrapped in copper wool first for heat transfer and Kaowool® next for thermal insulation.

The Pd/k Column-MS Column Configuration

Figure 5:
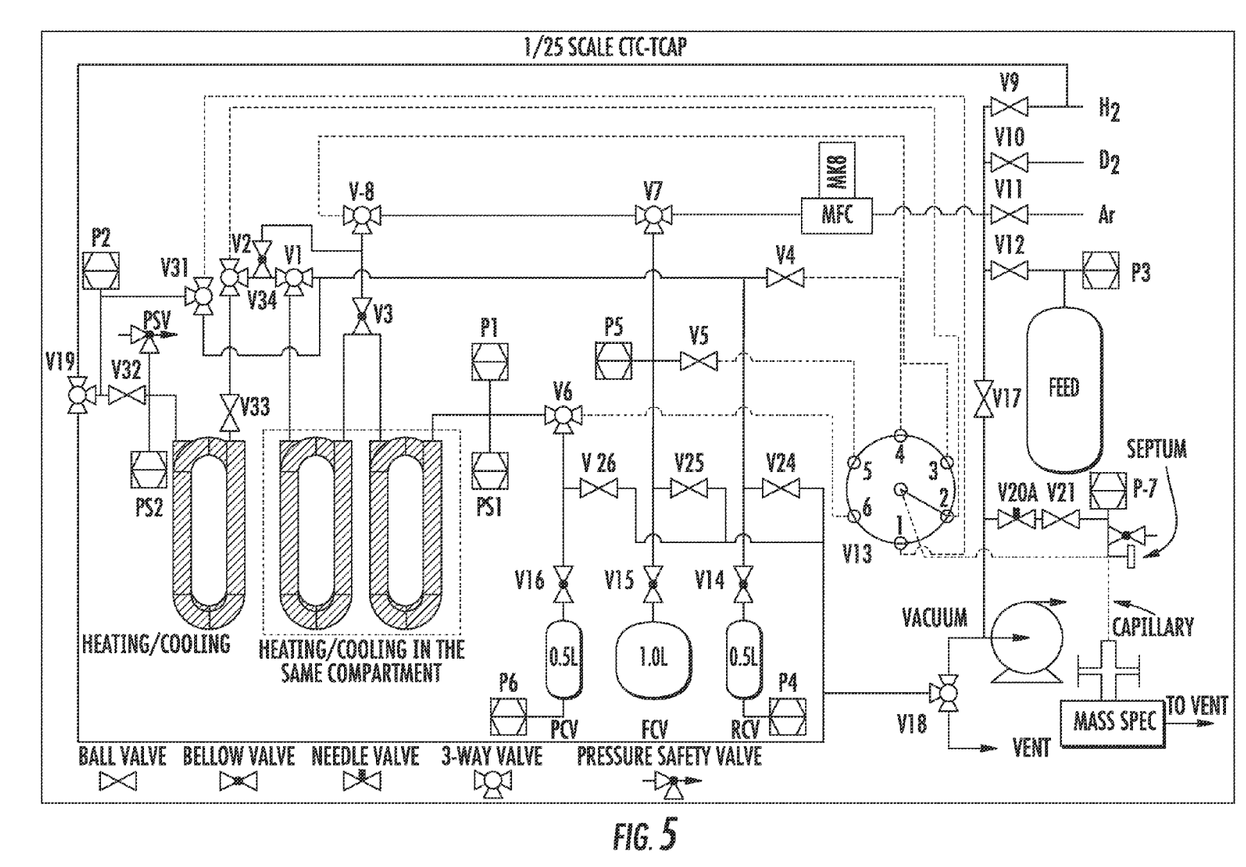
FIG. 5 is a schematic diagram similar to FIG. 2 but setting forth additional details of the process.

The PFR in the Pd/k column-PFR configuration is replaced with the MS column to form the Pd/k column-MS column configuration as best seen in FIG. 2. For this new configuration, the raffinate withdrawal point is removed from the Pd/k column position to the far end of the MS column. Referring to FIG. 5, the relocation is from point V1 to point V32. The MS column is heated and cooled to cycle the temperature between about −90 to −180° C. At the low temperature the MS column can adsorb up to about 12 standard liters of hydrogen depending on pressure. At the high temperature all the adsorbed hydrogen can be released. The molecular sieve has an isotopic effect opposite to that of palladium. In other words, the molecular sieve preferentially adsorbs the heavier hydrogen isotope. That is, it adsorbs tritium better than deuterium, deuterium better than protium. This isotopic effect is opposite but complementary to that of the palladium in the TCAP process. When they are paired together, they can produce both high purity product (heavier isotope) and raffinate (lighter isotope). The conventional palladium-PFR configuration can produce high purity product easily but is limited in producing a high purity raffinate having a lighter isotope.

Operation and Control

For the existing Pd/k column-PFR configuration, the Pd/k column absorbs and releases hydrogen during its temperature cycles. The PFR does not absorb hydrogen and operates at room temperature. The gas transfer and inventory can be measured and controlled through the pressure in the PFR.

For the Pd/k column-MS column configuration, both columns absorb and release hydrogen as their temperatures cycle. Measuring and controlling the gas transfer and inventory is done by saturating the MS column to a target amount at the low temperature and releasing the adsorbed hydrogen completely at the high temperature. This requires the use of well defined adsorption isotherms of the MS column. The operation steps of these two configurations are compared in Table 1.

TABLE 1

Comparing operation steps of the two TCAP configurations

| Steps | Pd/k column - PFR | Pd/k column - MS column |
|---|---|---|
| 1 | Cool Pd/k column | Cool MS column, heat Pd/k column |
| 2 | Feed column | Withdraw product |
| 3 | Transfer gas from PFR to Pd/k column | Transfer gas from Pd/k column to MS column |
| 4 | Heat Pd/k column | Cool Pd/k column Heat MS column |
| 5 | Withdraw product and raffinate | Withdraw raffinate Feed Pd/k column |
| 6 | Transfer gas from column to PFR | Transfer gas from MS column to Pd/k column |
| 7 | Repeat | Repeat |

Separation Stages of the Pd/k Column

Figure 4:
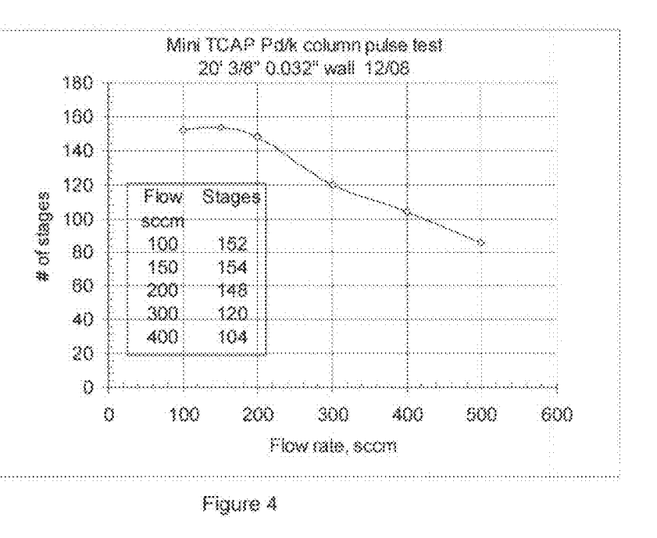
FIG. 4 sets forth flow rate data on stages obtained from $H_2$ flow using a $D_2$ pulse of the Pd/k column.

The Pd/k column was subjected to pulse tests by flowing protium through the column at flow rates of 100 to 500 sccm, and introducing a deuterium pulse at the same rate for 2 minutes. The peak of the deuterium concentration at the outlet of the column was measured using an online RGA. The height of the peak was compared with the results of a calculation model which related the peak height to the number of separation stages. Higher number of stage means better separation efficiency of the column. The results are shown in FIG. 4. A maximum of 154 stages were detected at the flow rate of 150 sccm though the number of stages decreases when the flow rate increases. The smaller diameter column shows better separation efficiency. Based on the number of separation stages, the small column demonstrates sufficient number of stages to achieve target separation of protium and deuterium to about 99%.

Total Reflux Operation of the Pd/k Column-PFR Configuration

Figure 6:
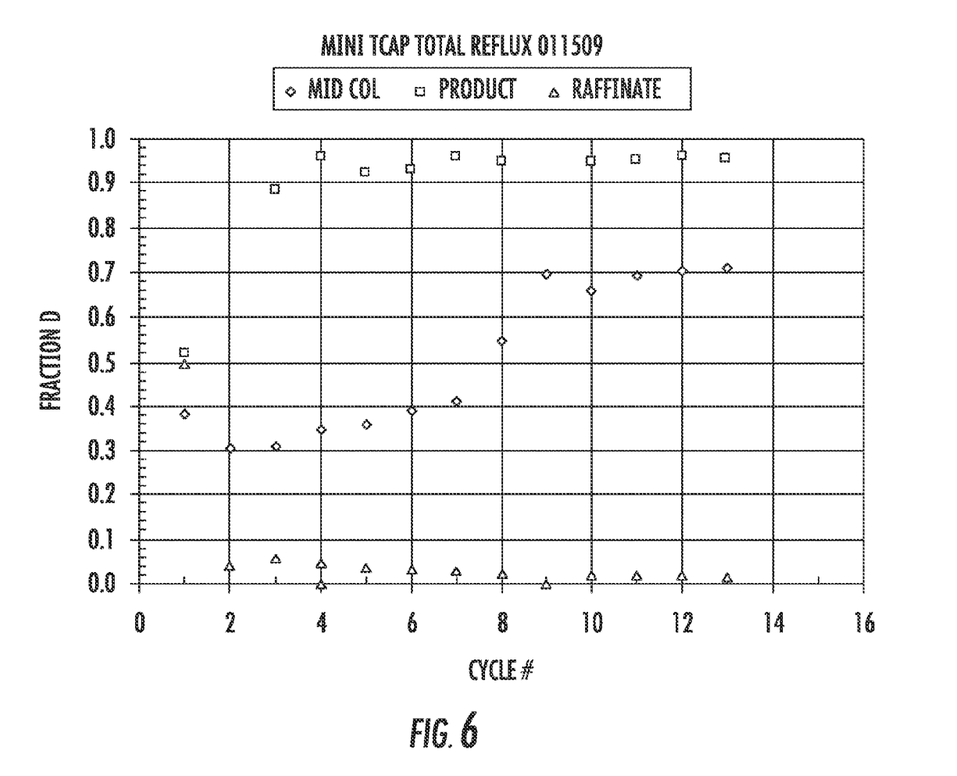
FIG. 6 sets forth data from reflux operation of the Pd/k column-PFR configuration.

The Pd/k column was loaded with 4 SL of $D_2$ from the product end and 4 SL of $H_2$ from the raffinate end. The PFR was loaded with 7 SL of $H_2$. The compositions at the mid point V-8, the product end V-6 and the raffinate end V-2 (Refer to FIG. 3 for the locations) were monitored by an online RGA. The results are shown in FIG. 6. The product and raffinate purities increased quickly as the number of cycles increased, and took about 11 cycles to approach steady state. The mid column composition started with about 30% D and increased gradually following an S shape trend.

Online Operation of the Pd/k Column-PFR Configuration

Figure 7:
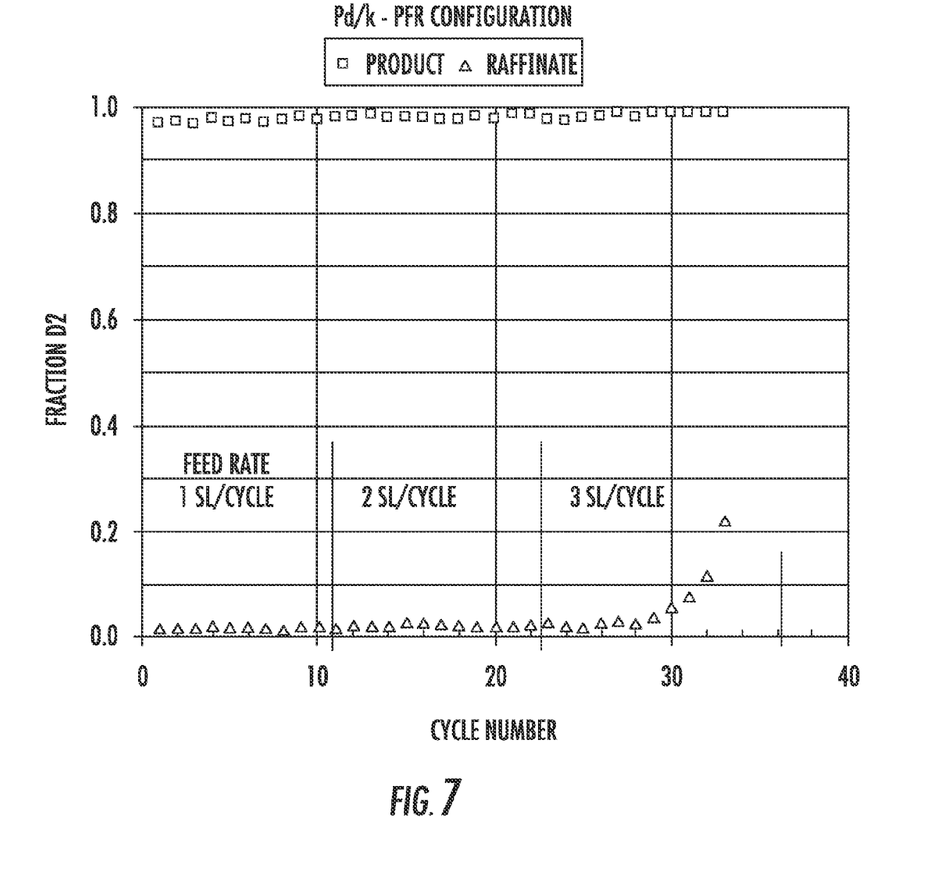
FIG. 7 sets forth operational data of the Pd/k column-PFR configuration following equipment equilibration.

Following the total reflux operation the process was operated in the online mode in which feed was introduced and product and raffinate were withdrawn every cycle. The feed concentration was 50% $D_2$ in $H_2$. The rate was first at 1 STP liter per cycle. After 12 cycles the rate was increase to 2 STP liters per cycle. At both rates the product was about 99% $D_2$ and raffinate was about 98% $H_2$ (2% $D_2$) based on RGA results. The flow rate was further increased to 3 STP liters per cycle at cycle number 24. After 2 cycles, the raffinate concentration began to decrease. It continued to decrease and reached 88% after 10 cycles when the operation stopped. The product purity did not change during these 10 cycles. This Pd/k column-PFR configuration produced higher purity heavy isotope than the lighter isotope. As discussed below, this deficiency is eliminated when the PFR is replaced with the active MS column. The results were plotted in FIG. 7. These results showed that the conventional Pd/k column-PFR configuration can support a feed rate of about 2 standard liter/cycle, but not 3 standard liter/cycle.

MS Column Preparation

Figure 8:
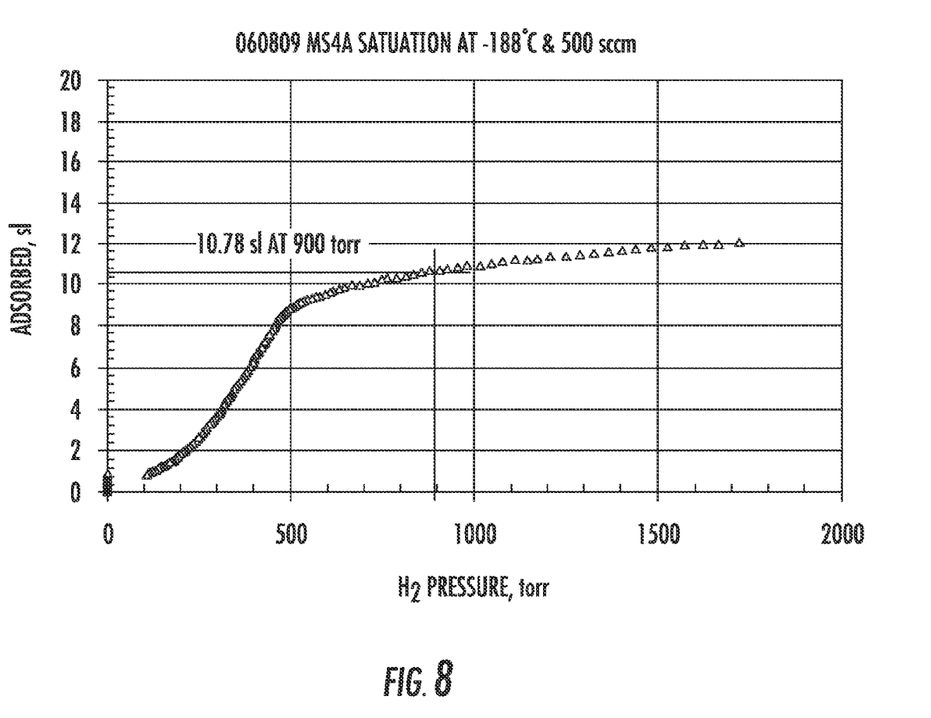
FIG. 8 sets forth hydrogen adsorption capacity of the inverse column at near liquid nitrogen temperatures and at the referenced pressures.
Figure 9:
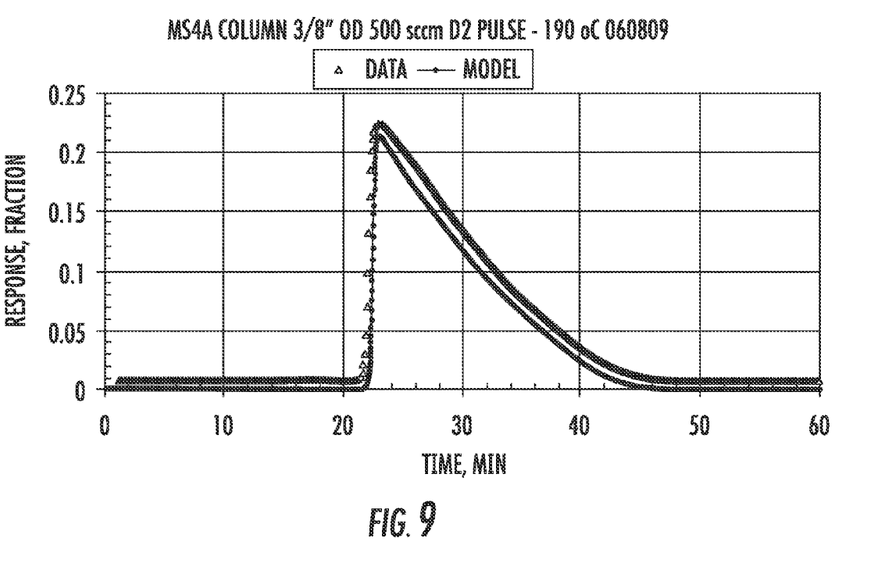
FIG. 9 sets forth data from a $D_2$ pulse test indicating the inverse column as a high stage number and can achieve good separation efficiency.

The inverse column was heated at 450° C. under helium purge for 184 hours to remove the moisture. Its hydrogen adsorption capacity and rate was tested with flowing hydrogen at near liquid nitrogen temperature (−196° C.). The results showed the adsorption capacity is large, about 100 scc/g, and is a strong function of temperature (Table 2) and pressure (FIG. 8). A series of $D_2$ pulse on $H_2$ flow tests was conducted to study the separation efficiency of the inverse column. For the tests, the column was cooled down to near liquid nitrogen temperature. Protium flow at a target rate was established. The flow of protium was switched to deuterium for 2 minutes. The flow of protium continued until the $D_2$ peak broke through. The shape and the height of the $D_2$ peak is a measure of the separation efficiency. Comparing the data with the calculated peak heights, the number of theoretical separation stages is identified. A large stage number is an indication of high separation efficiency. FIG. 9 shows the data and the calculated $D_2$ peak of a $D_2$ pulse test at 500 sccm. The calculation used a stage number of 500 which is a large value for a column of 11 ft long and indicates the column has very good separation efficiency.

TABLE 2

Inverse column molecular sieve at 2,000 torr protium

| Temperature, ° C. | −182.5 | −189 | −191.6 |
|---|---|---|---|
| Adsorption capacity, scc/g | 102 | 122 | 128 |

Figure 10:
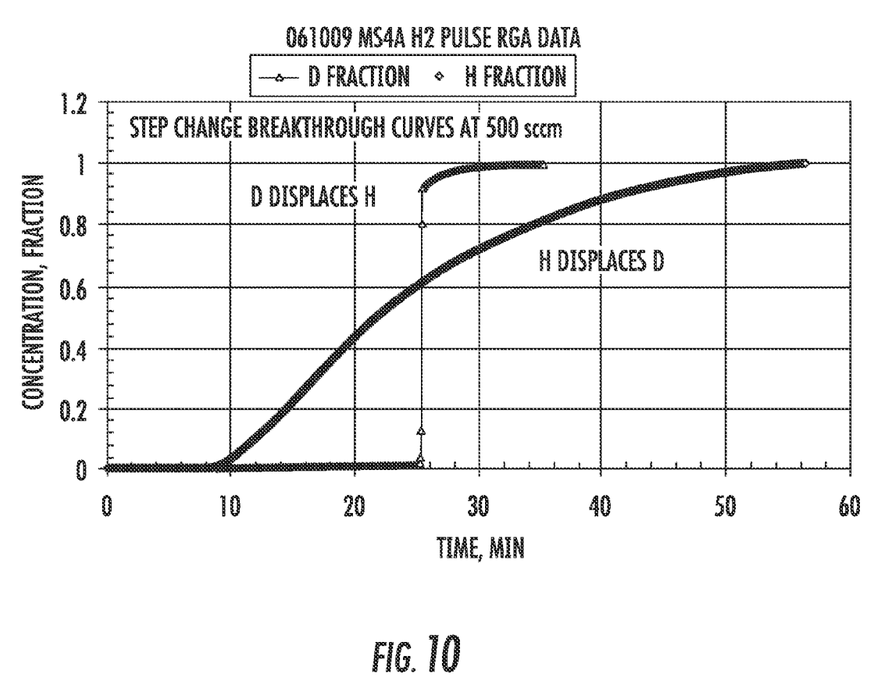
FIG. 10 sets forth data from the inverse column during changes in feed composition indicating the molecular sieve preferentially absorbs heavier D2 and in a manner opposite that of palladium.

A step change in feed concentration was also conducted. This test indicates the isotopic effect of molecular sieve toward the hydrogen isotopes. As shown in FIG. 10, when $D_2$ was used to displace the $H_2$ in the column, a very sharp breakthrough curve was generated, indicating that the molecular sieve preferentially adsorbed the heavier $D_2$ over the lighter $H_2$. On the contrary, when $H_2$ was used to displace the $D_2$, a very broad breakthrough curve was generated due to the infavorable adsorption of the lighter $H_2$. This effect is opposite to that of palladium.

Performance of the Pd/k Column-MS Column Configuration

The MS column was loaded with 5 SL of $H_2$ to begin the test. The inventory in the Pd/k column was about 7.5 SL of 50% $H_2$ and $D_2$ mixture left from earlier test. Total gas in the two columns was about 12.5 SL, slightly less than the 15 SL in the PFR configuration test. The process was started in the total reflux mode for 3 cycles before going to the online mode.

The operation steps have been outlined in Table 1 earlier. In the total reflux mode no feed was introduced to the column, or product and raffinate were withdrawn to verify target operating conditions. The results showed that the operation was satisfactory under the conditions listed in Table 3.

TABLE 3

Conditions for operating the mini TCAP in the
Pd/l column - MS inverse column configuration

|  | Pd/k column | MS column |
|---|---|---|
| Temperature, ° C. | −50 to 150 | −190 to −80 |
| Pressure, torr | 0 to 5500 | 0 to 9000 |
| Gas transfer, SL | ~4 | ~4 |

Figure 11:
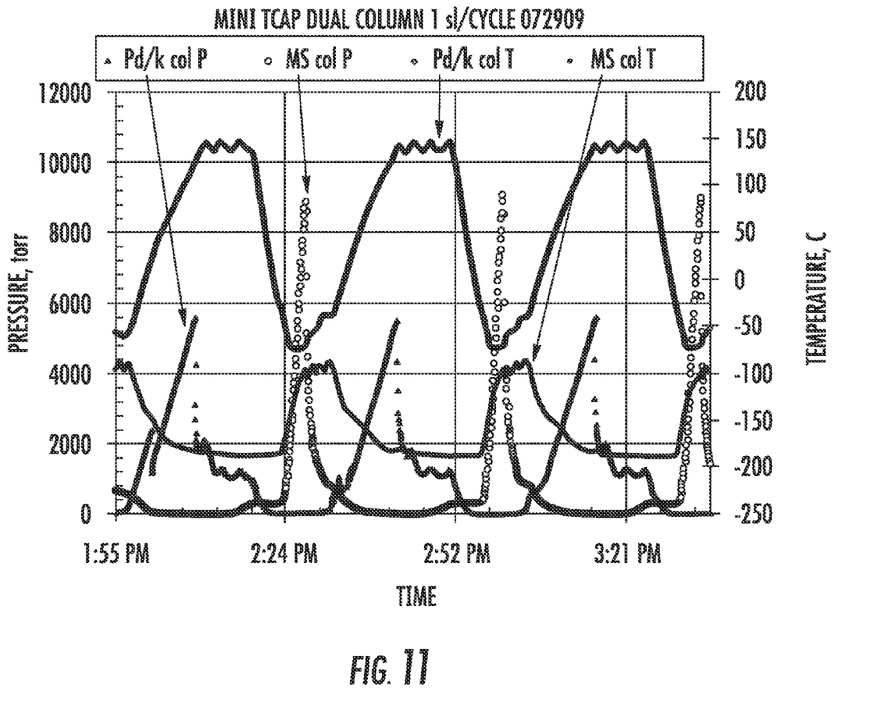
FIG. 11 sets forth temperature and pressure profiles of the Pd/k-MS column operation.

During gas transfer from the MS column to the Pd/k column, the transfer was complete when the far end of the Pd/k column reached 100 torr. During gas transfer from the Pd/k column to the MS column the transfer was complete when the far end of the MS column reached 300 torr. At 300 torr and −190° C. the adsorption capacity of the MS column was about 5 liters. When heated to −90° C., nearly all the adsorbed gas is released and most of it is transferred to the Pd/k column. The amount of gas left in the MS column was measured by pressure, temperature and volume. This amount was used to adjust the amounts of product and raffinate to withdraw, so that the inventory in the system was maintained. A typical temperature and pressure profile during online operation is shown in FIG. 11. After about 40 cycles, the gas transfer between the two columns decreased. The target fill pressure of the MS column had to be adjusted upward from the 300 torr toward 1,000 torr to maintain the desired amount of gas transfer. The cause for this need of change might be accumulation of moisture or other impurities in the MS column.

Figure 12:
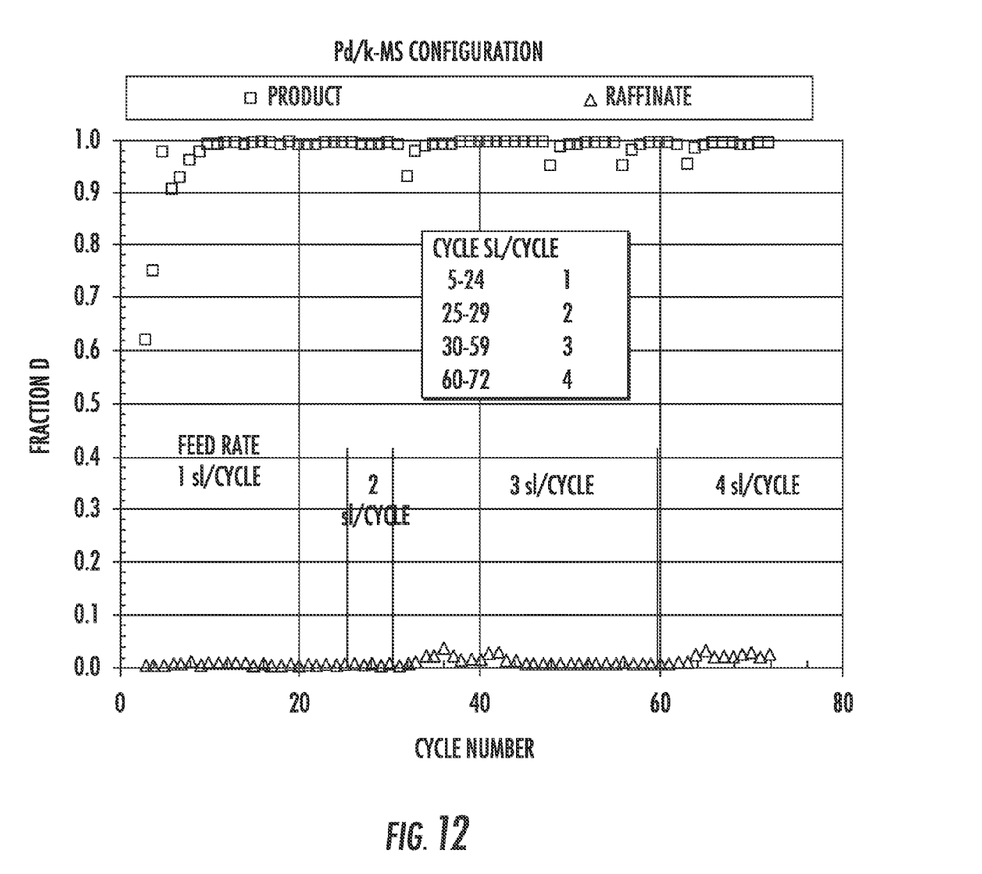
FIG. 12 sets forth the operational data of the present invention Pd/k-MS column configuration following equipment equilibration.

Online operation was started with the feed rate at 1 SL/cycle. The feed was a mixture of $H_2$ and $D_2$ at 50% each. After 22 cycles the feed rate was increased to 2 SL/cycle, and after 5 cycles it was further increase to 3 SL/cycle. For all 3 feed rates both the product and raffinate were better than 99% purity as measured by the online mass spec. These results are shown in FIG. 12. The data in this figure is compared to the data of the Pd/k-PFR configuration shown in FIG. 7. The product was maintained at better than 99% in both configurations as expected, since the Pd/k column is very efficient in producing high purity heavier isotopes. In comparison, the PFR configuration produced about 2% $D_2$ (98% pure raffinate, the lighter isotope stream) when the feed rate was at 1 and 2 SL/cycle, but could not maintain the Raffinate purity at 3 SL/cycle. The deuterium level in the raffinate started to increase immediately after the flow rate was increased to 3 SL/cycle, and reached 22% after 10 cycles. With the MS inverse column configuration, the deuterium level in the raffinate was about 0.55% which is about 4 times better than the 2% level by the PFR configuration. When the feed rate was increased to 3 SL/cycle $D_2$ level obtained was about 0.7% (99.3% $H_2$). This is a significant improvement over the PFR configuration, which produced only 98% $H_2$ at the low rate of 1 SL/cycle.

Past experience with the TCAP process has indicated that the maximum throughput per cycle is about 10% of the Pd/k column inventory. The Pd/k column absorption capacity is about 10 SL. Ten percent of that is 1 SL/cycle. The Pd/k-PFR configuration actually tested achieved 2 SL/cycle but could not achieve a 3 SL/cycle. The Pd/k-MS column configuration achieved 4 SL/cycle which is 40% of the Pd/k column inventory. Still higher feed rates are believed to be possible.

Palladium supported on kieselguhr (Pd/k) is used in the preferred embodiments above. Palladium by itself or in other forms such on other support materials or alloys can also be used. Other hydrogen absorbing materials which have isotopic effect similar to palladium can also be used to replace palladium in the above examples. These other materials include metal hydrides such as lanthanum nickel and lanthanum nickel aluminum alloys.

Molecular sieve type 4A is used in the preferred embodiments above for the MS column. Other microporous material consisting of molecular sieves, activated carbon, alumina, silica, silica-alumina, or clays can also be used in place of the MS type 4A. Molecular sieves (also known as zeolites) includes type 3A, 4A, 5A, X, Y, ZSM-5, Mordenite, L, Omega, or other types having 3-10 Angstrom pore diameters may also be used. Transition metals such as vanadium and chromium, and their alloys can absorb hydrogen isotopes and have isotopic effect similar to molecular sieve can also be used.

Additional description and data may be found in reference to a publication by the named inventors, entitled "TCAP Hydrogen Isotope Separation Using Palladium and Inverse Columns", having a document identification number of SRNL-STI-2010-00033, publicly released by the US DOE on Sep. 15, 2010 and which is incorporated herein by reference.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention which is set forth in the following claims. In addition, it should be understood that aspects of the various embodiments may be interchanged, both in whole, or in part. Therefore, the spirit and scope of the appended claims should not be limited to the description of the preferred versions contained therein.

That which is claimed:

1. The process of obtaining purified hydrogen isotopes comprising the steps of:
   providing a hydrogen isotope mixture as feedstock;
   separating the feedstock in a first separation column, said first separation column preferentially absorbs a lighter hydrogen isotope (i.e., protium vs. deuterium, or deuterium vs. tritium, or protium vs. tritium) and is operated over a temperature range of between −40° C. to 150° C.;
   providing further separation of the feedstock in a second separation column, said second separation column preferably absorbs heavier hydrogen isotope (i.e., tritium vs. protium, or tritium vs. deuterium, or deuterium vs. protium) and operating of a temperature range of between −196° C.--100° C.;
   transferring said feedstock from said first separation column to said second separation column, and also transferring said feed stock from said second separation column to said first separation column, thereby providing a purified heavy hydrogen isotope from said first separation column and a purified light hydrogen isotope from said second separation column.

2. The process according to claim 1 wherein said first column is heated and said second column is cooled, thereby transferring a portion of the gas feedstock from the first column to the second column.

3. The process according to claim 1 wherein said second column is heated and said first column is cooled, thereby transferring a portion of the gas feedstock from the second column to the first column.

4. The process according to claim 1 wherein said first separation column has palladium supported on kieselguhr (Pd/k) as a packing material.

5. The process according to claim 1 wherein said first separation column has palladium or palladium alloy as a packing material.

6. The process according to claim 1 wherein said second separation column has packing material selected from microporous material consisting of molecular sieves, activated carbon, alumina, silica, silica-alumina, or clays.

7. The process according to claim 6 wherein said molecular sieves is selected from the group consisting of zeolites, 3A, 4A, 5A, X, Y, ZSM-5, Mordenite, L, Omega, and combinations thereof and having a pore diameter of between about 3 to about 10 Angstroms.

8. The process according to claim 1 wherein said second separation column has packing material selected from the group consisting of transition metals, vanadium, chromium, transition metal alloys and combinations thereof.

9. The process according to claim 1 wherein said feed stock is cycled multiple times between said second column and said first column until a desired concentration of isotopes within said respective first and second columns is obtained.

10. The process according to claim 1 wherein said first column has number of stages of at least 10, and preferably at least 100, and even more preferably at least 120 as an indication of separation efficiency.

11. The process according to claim 1 wherein said second column has number of stages of at least 30, and preferably at least 100, and even more preferably at least 300 as the indication of separation efficiency.

12. The process according to claim 6 wherein said molecular sieve is Y and having a pore diameter of between about 3 to about 10 Angstroms.

* * * * *